May 25, 1948.                A. D. COLE                2,442,072
                    THERMOSTAT OPERATED RHEOSTAT
                        Filed June 23, 1945
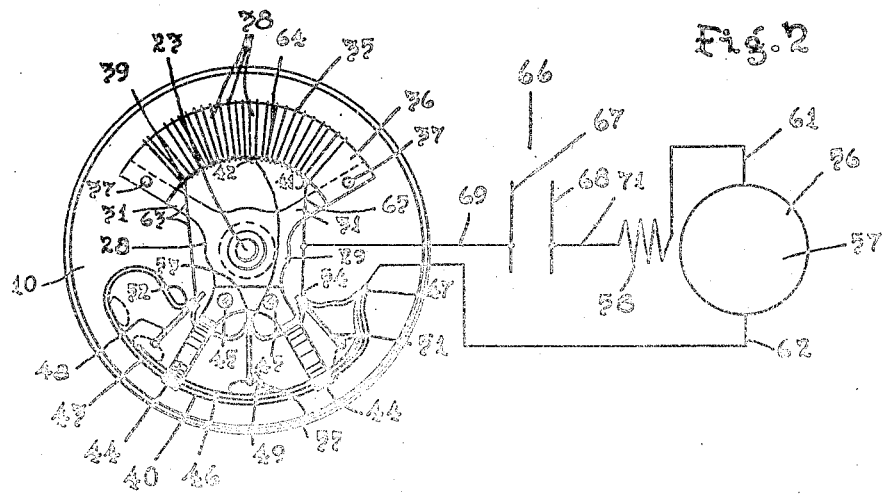
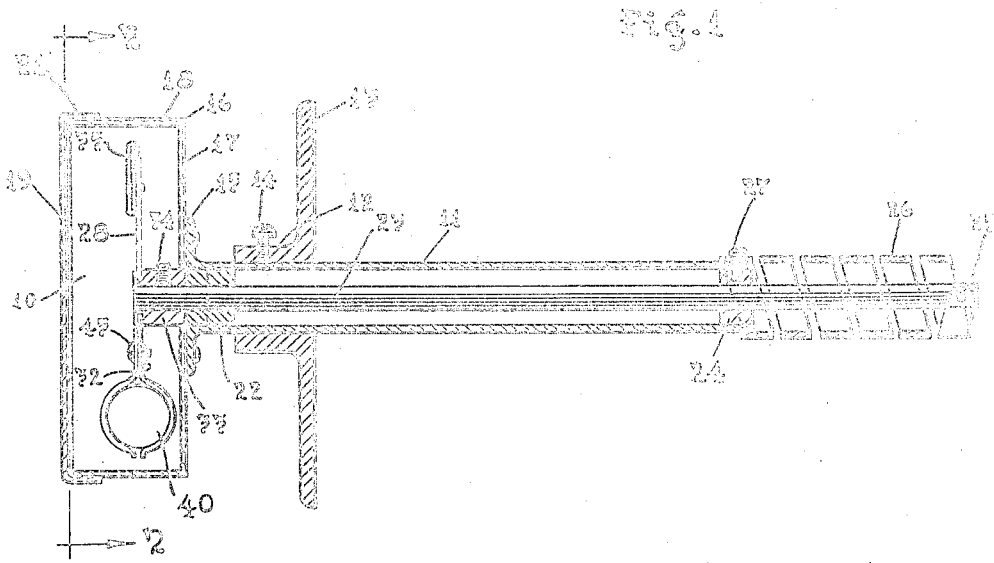
INVENTOR.
Arthur D. Cole
BY
ATTORNEYS Patented May 25, 1948

2,442,072

UNITED STATES PATENT OFFICE 2,442,072

THERMOSTAT OPERATED RHEOSTAT

Arthur D. Cole, Minneapolis, Minn.

Application June 23, 1945, Serial No. 601,205

5 Claims. (Cl. 201—55)

My invention relates to motor controls and has for an object to provide a control by means of which an electric motor may be caused to run at different speeds, depending upon temperature conditions.

An object of the invention resides in providing a switch and a variable resistor operated by the switch and functioning to control the speed of a motor.

A feature of the invention resides in providing a construction whereby a minimum number of flexible leads are employed in connection with the resistor and switch.

Another object of the invention resides in providing a control in which wiping contacts are done away with.

Another object of the invention resides in providing a movable support and in mounting on said support one of the switch elements and the resistor and in utilizing a fixed conductor between the switch element and resistor.

A feature of the invention resides in pivoting the movable support about a horizontal axis and utilizing for the switch a mercury switch disposed below the axis of the movable member.

Another object of the invention resides in disposing the resistor above the axis of the movable member.

A feature of the invention resides in constructing the mercury switch and resistor arcuate in form and in mounting the same substantially concentrically.

Other objects of the invention reside in the novel combination and arrangement of parts and in the details of construction hereinafter illustrated and/or described.

In the drawings:

Fig. 1 is an elevational longitudinal sectional view of a motor control illustrating an embodiment of my invention.

Fig. 2 is a wiring diagram of the motor and control and showing the motor control in cross section, taken on line 2—2 of Fig. 1.

The invention proper comprises a motor control which I have indicated in its entirety by the reference numeral 10. This motor control comprises a tubular housing 11 which is rotatably mounted in a boss 12 formed on an attaching flange 13. The said housing may be held in adjusted position within the boss 12 by means of a set screw 14. The end of the housing 11 has formed on it a flange 15 which has attached to it a case 16. Case 16 has a rear wall 17 to which the flange 16 is riveted and a circumferential wall 18, said case being open at the front. The case 16 is closed by means of a cover 19 having a flange 21 adapted to fit over the wall 18 of the case proper.

Within the housing 11 and at the end thereof adjacent the flange 15 is a bearing 22 which rotatably supports one end of a shaft 23. This shaft is supported at its other end in a bearing 24 which is disposed within the housing 11 at its opposite end. The shaft 23 extends through and beyond the housing 11 and has attached to its protruding end one end 25 of a spirally wound strip of bi-metal 26. The other end of this strip of bi-metal is attached by means of a screw 27 to the housing 11. The said screw also serves to hold the bearing 24 in place. It will readily become comprehended that when the strip of bi-metal 26 is heated, the same expands, causing rotation of the shaft 23.

Located within the case 16 is a mounting 28 which is formed with a central portion 29 and arms 31 and 32 extending outwardly therefrom. The central portion 29 is secured to a bushing 33 which is mounted upon the inner end of the shaft 23 and which is attached thereto by means of a set screw 34. This mounting supports the various parts of the invention.

Mounted on the arms 31 is a resistor 35 which includes an insulator 36, sheet-like in form, and constructed of insulating material. This insulator is attached to the said mounting by means of rivets 37 which extend through the ends of said insulator and the arms 31. The insulator 36 is arcuate in form and has wound on it a winding 38 of resistance wire having terminals 39 and 41 and an intermediate tap 42. Below the shaft 23 is provided a mercury switch 40 which consists of a glass tube 43 closed at its ends. This tube is arcuate in form, being arranged in concentric relation with respect to the axis of the shaft 23 and is held in position by means of two clips 44 which are attached to the mounting 27 by means of screws 45. These clips cooperate with the arms 32 and hold the switch firmly in position. The switch 40 has an elongated contact 46 which extends along the lowermost curved wall thereof and terminates in a terminal 47. The said switch further has three contacts 48, 49 and 51 which are located in spaced relation with respect to one another and above the contact 46 and which have terminals 52, 53 and 54 extending through the tube 43. The contacts 48, 49 and 51 are close enough to the contact 46 so that as the shaft 23 is rotated, the globule of mercury 55 within the tube 43 may successively make contact with the contacts 48, 49 and 51.

For the purpose of illustrating the application of my invention, an electric motor 56 is shown in conventional form having a rotor 57 and a stator winding 58. The rotor 57 is energized by conductors 61 and 62, the former of which is connected to the stator winding 58 and the latter of which is connected to the terminal 47 of switch 40. A conductor 63 connects the terminal 39 of resistor 35 with the terminal 52 of switch 40. The second conductor 64 connects the tap 42 of resistor 35 with the terminal 53 of switch 40, while another conductor 65 connects the terminal 41 of resistor 35 with the terminal 54 of switch 40. It will be noted that the three conductors 63, 64 and 65 extend between parts of the control which are mounted on the mounting 28 and which therefore rotate with the said mounting and do not need to be flexible. The motor 56 is energized by a line 66 having conductors 67 and 68. Conductor 67 is connected by means of a conductor 69 with the conductor 65, while the conductor 68 of the line 66 is connected by means of a conductor 71 with the stator winding 58 of the motor 56.

In the usual arrangement where a separate resistor is used to control the speed of a motor, all of the leads connected to the resistor and switch are flexible. In my invention, only the leads 62 and 69 need be flexible, the remaining leads being movable with the mounting on which the switch and resistor are mounted.

The method of operation of the invention is manifest. When the thermally responsive member 26 operates, shaft 23 is rotated in one direction or the other, depending upon whether the thermally responsive member is being cooled or heated. This successively brings the contacts 48, 49 and 51 into electrical connection with the contact 46. When the circuit is closed through contact 48, all of the resistance of resistor 35 is connected in series with the rotor and stator winding of the motor 56, so that the voltage of the same is reduced and the motor operates at its lowest desired speed. When the temperature of the thermally responsive member 26 changes to bring the globule of mercury into contact with contacts 46 and 49, only a portion of the resistance of the resistor 35 is connected in series with the motor 56. This partially reduces the resistance, so that the motor operates at a greater speed than would be the case if all of the resistance of the resistor 35 were connected in the motor circuit. When the shaft 23 is rotated so that the contacts 51 and 46 are closed, the entire resistor 35 is cut out and the motor runs at its maximum speed.

The advantages of my invention are manifest. The device is extremely simple in construction and can be easily and economically manufactured at a small expense. By constructing the resistor and switch arcuate in form, the same are readily installed in a compact cylindrically shaped case. The resistor and switch being opposite one another tend to counterbalance each other so that uniformity of action of the device occurs. With the arrangement of parts, the number of flexible leads utilized with the invention is greatly reduced.

Changes in the specific form of my invention, as herein described, may be made within the scope of what is claimed without departing from the spirit of my invention.

Having described my invention, what I claim as new and desire to protect by Letters Patent is:

1. A motor control comprising a revoluble support pivoted for swinging movement about a horizontal axis, a mercury switch carried by said support and normally disposed below said axis, a resistor carried by the support and disposed above said axis in counterbalancing relation with respect to said switch and a conductor connecting said resistor and said switch, said switch, resistor and conductor being fixed relative to one another and being jointly movable with said support.

2. A motor control comprising a support pivoted about a horizontal axis extending through the center thereof, a mercury switch arcuate in form and carried by said support, said switch being disposed below the axis of said support, a resistor arcuate in form and carried by said support, said resistor being disposed above the axis of said support and in substantially concentric relation with respect to said switch the maximum radius of said switch being substantially equal to the maximum radius of said resistor and a conductor connected to said resistor and switch, said switch, resistor and conductor being fixed relative to one another and being jointly movable with said support.

3. In a motor control, a horizontal shaft, a hub on said shaft, a plate secured to said hub and formed with two upwardly extending arms and two downwardly extending arms, a mercury switch carried by said downwardly extending arms, a resistor carried by said upwardly extending arms and conductors connected to said switch and resistor.

4. In a motor control, a support pivoted about a horizontal axis, a mercury switch arcuate in form and carried by said support, said switch being disposed below the axis of said support and with its center at the axis of said support, a resistor carried by said support and disposed above the axis of said support in counterbalancing relation relative to said switch and conductors connected to said switch and resistor.

5. In a motor control, a support pivoted about a horizontal axis, a mercury switch carried by the support and disposed below the axis of said support, said switch having a track along which the mercury travels, said track being arcuate in form and having its center at the axis of said support, a resistor disposed above the axis of said support in counterbalancing relation with respect to said switch and conductors connected to said switch and resistor.

ARTHUR D. COLE.

REFERENCES CITED

The following references are of record in the file of this patent:

UNITED STATES PATENTS

| Number | Name | Date |
|---|---|---|
| 1,375,780 | DeKhotinsky | Apr. 26, 1921 |
| 1,793,954 | Myers | Feb. 24, 1931 |
| 2,023,740 | Mattern | Dec. 10, 1935 |
| 2,023,748 | Shipley | Dec. 10, 1935 |